Aug. 6, 1935.  A. F. MONEUSE ET AL  2,010,739
COFFEE OR TEA URN
Filed Aug. 29, 1930
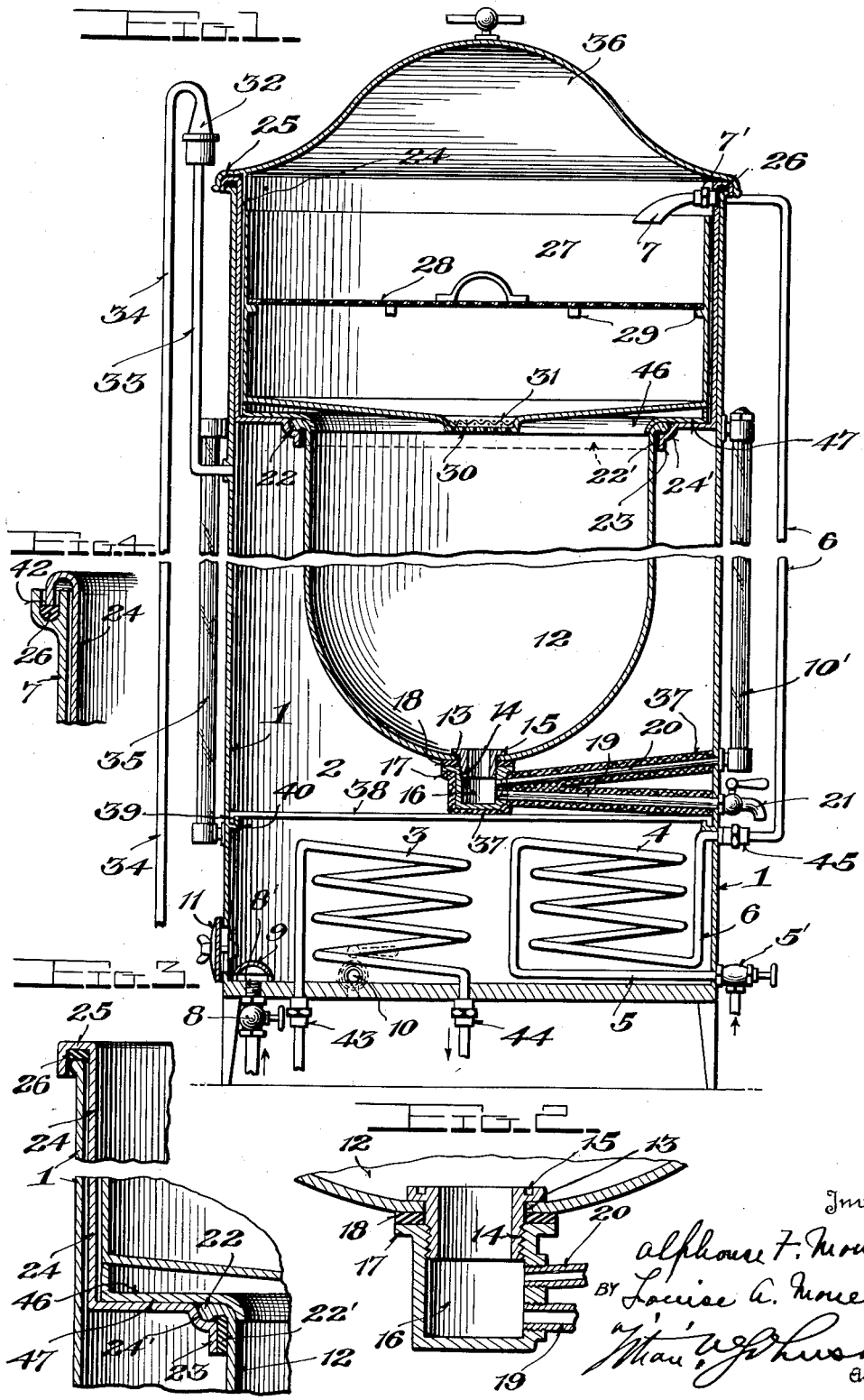

Patented Aug. 6, 1935

2,010,739

UNITED STATES PATENT OFFICE 2,010,739

COFFEE OR TEA URN

Alphonse F. Moneuse and Louise A. Moneuse, New Rochelle, N. Y.; Alphonse F. Moneuse administrator of said Louise A. Moneuse, deceased Application August 29, 1930, Serial No. 478,740

3 Claims. (Cl. 53—3)

This invention relates to improvements in coffee or tea urns. The objects of the invention are several, all having the general purpose of improving urns of this character throughout and particularly the provision of an apparatus that can be operated by any person of ordinary intelligence, there being no occasion for timely manipulation of various valves or faucets to direct the boiling water (which is often stale, dead or charged with sediment or unfit for beverage making), from one part of the apparatus to another, or from one apparatus to another.

Among the most important of the objects is to so construct the apparatus that it will be possible to make a beverage of better quality considering grade of beverage base, than heretofore which in the present instance we are enabled to do by providing a structure wherewith fresh, instantaneously heated hot water is delivered to the jar or coffee receptacle directly from the main, instead of boiling the same in an urn and creating a pressure sufficient to force the hot water from its source to the jar or coffee compartment.

Another object is to so associate the coffee receptacle or jar and connected parts that they can be readily removed for cleaning, repairs, or other purposes, and can so construct and protect the coffee gauge and coffee delivery pipes that the beverage that remains in them will not boil, or in the fitting to which they are connected at the bottom of the jar.

In the drawing illustrating the invention:

Fig. 1 is a section of an urn, some of the parts being in elevation, the figure being somewhat diagrammatic;

Fig. 2 is an enlarged section of a portion of the bottom of the beverage receptacle or jar showing more clearly the manner of attaching the jar to the gauge and delivery pipes;

Fig. 3 is a similar view showing the manner of connecting the jar to the percolator holder, and the manner in which the percolator holder is supported by the upper edge of the urn body; and Fig. 4 is a detail, showing another way of supporting the holder by the urn body.

Referring to the drawing: the numeral 1 designates the body of the urn which has a hot water compartment 2 in which the water is heated to heat the beverage in the jar or beverage receptacle and also to heat the cold fresh water coil 4. Heat for this purpose is supplied by a steam coil 3, located in the bottom of the urn, although the water in this compartment may be heated by a fuel burner or by electricity as may be desired, this portion of the device forming no essential part of our invention.

The numeral 4 designates what I term a fresh water coil. This coil is also located in the bottom of the hot water compartment of the urn and the upper convolution of the coil is connected to a pipe 5 extending through the wall of the urn, where, on the outside it is provided with a valve 5' through which fresh cold water from the main is admitted to the coil and instantaneously heated therein and passed to the percolater as will appear. To the lower convolution of the coil is connected a pipe 6, also extending through the wall of the urn, near the coil, and back through the wall thereof near the top of the urn, where on the inside of the body it is provided with a detachable delivery tube or nozzle 7 which is connected to the pipe by a union connection 7' the purpose of the nozzle being to deliver hot water from the fresh water coil 4 to the percolator, presently to be described, and the purpose of the union connection is to enable the nozzle to be shifted out of the way when it is desired to move the percolator and connected parts.

The numeral 8 designates the cold water feed valve through which water for heating the beverage is admitted to the urn. Preferably over the inner end of the nipple 8' of this valve is arranged a cap 9, spaced from the floor of the urn and serving the purpose of preventing too great pressure, should there be such, of the water admitted through the valve. Just above the valve 8 the usual draw-off faucet 10 is provided and the urn body is also provided near the bottom with the usual clean-out hole 11.

The numeral 12 designates the jar that holds the beverage, either coffee or tea, after it has been "percolated" through the percolator from which jar it is delivered through the service or delivery faucet for use and to the beverage gauge 10', to denote the strength of the beverage in the jar. This jar may be made of glass, porcelain, or of metal suitable for the purpose. The bottom of bowl portion of the jar is provided with an opening 13 for the passage of the threaded portion 14 of a flanged bushing 15, the threaded portion of the bushing being adapted to be screwed into the internally threaded opening in a cup 16, which cup, as better shown in Fig. 2 is provided with a flange 17, which underlies the flange on the bushing 15, so that when the bushing is screwed into the cup, the marginal portion of the opening 13 of the jar will be clamped between the flanges of the cup and the bushing, there being a washer 18 of compressible material interposed between the bowl and cup flange. The inner ends of the tube pipes 19 and 20 are let into the cup 16, the pipe 19 being the service or delivery pipe and the pipe 20 being that which leads to the beverage gauge. Both of these pipes, as shown, extend through the wall of the urn and the pipe 20 enters the usual gauge fitting, and 19 is provided with a faucet 21.

The upper end of the jar is provided with an annular bead 22 and immediately below this bead is a band 22' that completely encircles the jar. To this band is soldered or otherwise secured the short depending flange 23 of the percolator holder 24, there being provided in the bottom of the holder adjacent to the point of attachment of the flange 23 to the band 22', an annular groove 24' in which rests the bead 22 of the jar. The upper edge of the holder 24 is formed with an annular channel 25 extending entirely around the holder which channel embraces the upper edge of the urn body thus providing a construction in which the entire percolator holder and connected parts are supported in the main by the urn body, there being provided in the channel a suitable compressible gasket 26, so that when the jar is fastened to the cup 16 by screwing down the bushing 15 the top edge of the urn body will fit tightly against the gasket thus making the compartment 2 a water and steam-tight compartment.

The percolator is indicated by the numeral 27. It fits properly into the percolator holder 24, there being provided about midway of the percolator a perforated spreader plate 28 or this may be a screen, and in any event it is supported by a series of projections 29 or a continuous bead may be substituted for the projections. This spreader plate is for the purpose of spreading the water uniformly over the ground coffee or tea leaves that occupy the space below the spreader.

Centrally located in the bottom of the percolator is the drip or strainer opening 30 spanned by any suitable strainer means supplemented in the present instance by a disk 31 of filter paper, gauze or other suitable material adapted to bring about comparatively slow dripping operation. It would be noted that the bottom of the percolator inclines downwardly from the sides toward the center, thus forming a sump toward which the beverage essences pass from or parts of the percolator and finally through the sieves, ready for use, into the jar.

The apparatus is provided with safety valve 32 connected by a pipe 33 to the compartment 2 below the percolator holder and connected with the valve is a drip pipe 34, and the urn is further provided with a water level gauge 35 and a snugly fitting cover 36, completes the apparatus, in the main.

As shown in Fig. 1 the pipes 19 and 20 and the cup 16 are covered by a covering 37 of insulating material, for the purpose as intimated for preventing the beverage contained therein from boiling.

The numeral 38 designates a bar placed centrally across the water compartment of the urn, which bar is provided with down turned ends 39 received in brackets 40, the bar being for the purpose of providing an additional support for the cup 16 and the pipes 19 and 20.

In the modification shown in Fig. 4 the upper edge of the urn body is provided with a channel 42 which receives the down turned edge of the percolator holder 24.

The numeral 46 designates a removable ring whose flat underneath portion rests upon the bottom of the percolator holder, and the inner down turned edge of the ring overlaps the bead 22 of the beverage jar thus forming a protection for the same.

The inlet and outlet types of the coil 3 are connected to the coils by unions 43 and 44, and the outlet pipe of the coil 4 is similarly connected with the pipe 6 thus providing a structure wherein these coils may be readily disconnected for cleaning purposes or for the purposes of repair. It will be also noted that the valve 5' is also of such construction that it may be readily detached from the coil 4 for the same purpose.

Heretofore, so far as I am aware, the coils of urns of this character are not detachable but are soldered to the urn body and in case of accident or need of repairs the whole bottom of the urn had to be disconnected and the coils unsoldered, whereas in the present instance to remove the coils it is only necessary to unscrew the unions 43 and 44 in case of the heating coil and the union 45 and valve 5' of the coil 4. This can be quickly and conveniently accomplished at trifling cost compared to the method that had to be followed heretofore.

While I have shown the unions 43 and 44 on the outside of the urn, and at the bottom thereof, it will be understood that these unions may be on the inside of the urn. So also may the union 45 now shown on the outside of the urn body be placed on the inside, the main purpose, as stated in the immediately foregoing paragraph of the use of the unions, is to enable the coils to be conveniently and quickly disconnected, where repairs are desirable.

In operation the water in compartment 2 is adequately heated imparting heat to the jar 12 and fresh water coil. The beverage base, either ground coffee, tea leaves or other substance from which the beverage is to be made is placed in the percolator 27. Fresh water from the main is admitted to the coil 4 through the faucet 5', in which coil the water is instantaneously heated and passes through the pipe 6 and through the nozzle 7 to the percolator, and spreading over the plate 28 passes through the perforations therein to and over the beverage base in the lower part of the jar and from thence through the screen opening 30 to the beverage receptacle wherein it is kept at the proper serving temperature by the hot water in the compartment 2 and ready to be drawn off through the pipe 19.

We claim:—

1. In combination with the urn body, a percolator holder therein, a beverage container carried by said holder, a hollow element below said container, means cooperating with said holder to produce a steam and water-tight joint between the urn body and the holder upon a positive downward movement of the beverage receptacle, incident to the connection of the beverage container to said hollow element.

2. In an urn of the character described, in combination with the urn body, a percolator holder having an annular channel for the reception of the upper edge of the urn body, a beverage receptacle supported by said holder, a suitable packing in said channel adapted to be compressed upon the positive downward movement of the holder to form a water and steam-tight joint between the body and the holder, and threaded means located in the lower part of the beverage receptacle, operable to draw down the holder through the medium of said receptacle, to compress the packing and produce an air and steam tight joint between said holder and the body of the urn.

3. In an urn of the character described, in combination with the urn body, a percolator holder, a beverage receptacle carried by said holder, a stationary element in the urn below the receptacle, threaded means cooperating with said element to connect said element and beverage receptacle and in so doing effect a steam and water-tight joint between the holder and urn body.

ALPHONSE F. MONEUSE.
LOUISE A. MONEUSE.